United States Patent
Melancon

(10) Patent No.: US 7,255,227 B2
(45) Date of Patent: Aug. 14, 2007

(54) HINGE ROD RETENTION IN MODULAR CONVEYOR BELT EDGES BY MEANS OF RESILIENT BLOCKING ELEMENTS

(75) Inventor: Stephen Melancon, Mandeville, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 10/907,519

(22) Filed: Apr. 4, 2005

(65) Prior Publication Data

US 2006/0219530 A1    Oct. 5, 2006

(51) Int. Cl.
B65G 17/06 (2006.01)
(52) U.S. Cl. .................................................. 198/853
(58) Field of Classification Search ......... 198/850–853
See application file for complete search history.

(56) References Cited

U.S. PATENT DOCUMENTS

| | | | |
|---|---|---|---|
| 4,114,467 A | 9/1978 | Petershack | 198/851 |
| 4,709,807 A | 12/1987 | Poerink | 198/853 |
| 4,832,187 A | 5/1989 | Lapeyre | 198/851 |
| 4,858,753 A | 8/1989 | Hodlewsky | 198/853 |
| 4,893,710 A | 1/1990 | Bailey et al. | 198/853 |
| 5,000,312 A | 3/1991 | Damkjaer | 198/853 |
| 5,058,732 A | 10/1991 | Lapeyre | 198/852 |
| 5,083,660 A | 1/1992 | Horton | 198/853 |
| 5,156,264 A | 10/1992 | Lapeyre | 198/852 |
| 5,217,110 A | 6/1993 | Spangler et al. | 198/852 |
| 5,253,749 A | 10/1993 | Ensch | 198/850 |
| 5,293,989 A | 3/1994 | Garbagnati | 198/853 |
| 5,303,818 A | 4/1994 | Gruettner et al. | 198/850 |
| 5,332,084 A | 7/1994 | Greve | 198/853 |
| 5,335,768 A | 8/1994 | Schladweiler et al. | 198/853 |
| 5,435,435 A | 7/1995 | Chiba et al. | 198/853 |
| 5,482,156 A | 1/1996 | Damkjaer | 198/853 |
| 5,586,644 A | 12/1996 | Coen et al. | 198/853 |
| 5,598,916 A | 2/1997 | Horton et al. | 198/852 |
| 5,645,160 A * | 7/1997 | Palmaer et al. | 198/853 |
| 5,662,211 A | 9/1997 | Quentin | 198/853 |
| 5,816,390 A | 10/1998 | Stebnicki | 198/853 |
| 5,826,705 A * | 10/1998 | Ramsey et al. | 198/853 |
| 5,899,322 A * | 5/1999 | Gamble, Jr. | 198/853 |
| 5,904,241 A | 5/1999 | Verdigets et al. | 198/853 |
| 5,996,776 A | 12/1999 | van Zijderveld | 198/853 |
| 6,308,825 B1 | 10/2001 | Nakamura | 198/853 |
| 6,499,587 B1 | 12/2002 | Greve | 198/853 |
| 6,763,936 B2 | 7/2004 | Marsetti et al. | 198/844.1 |
| 6,814,223 B1 | 11/2004 | Verdigets et al. | 198/844.1 |
| 6,857,516 B1 | 2/2005 | Verdigets | 198/844.1 |

* cited by examiner

*Primary Examiner*—Joe Dillon, Jr.
(74) *Attorney, Agent, or Firm*—James T. Cronvich

(57) ABSTRACT

An edge module for a modular plastic conveyor belt with a resilient blocking member for preventing migration of a hinge rod out of its resident position in the hinge joint of the belt. The edge module includes a hinge rod aperture intersected by a recess. A blocking element in the form of a resilient strip is retained at one end in the recess against a curved outer side wall of the recess in a blocking position occluding the aperture. The other end of the blocking element is elastically deformable away from the outer side wall into a non-blocking position by the force of a hinge rod being inserted into the aperture from the outside edge of the module.

20 Claims, 3 Drawing Sheets

HINGE ROD RETENTION IN MODULAR CONVEYOR BELT EDGES BY MEANS OF RESILIENT BLOCKING ELEMENTS

BACKGROUND

The invention relates generally to power-driven conveyors and, more particularly, to hinge rod retention structure in plastic conveyor belts constructed of rows of modules pivotally interconnected by hinge rods.

Conventional modular plastic conveyor belts and chains are constructed of modular plastic links, or belt modules, arranged end to end and side to side in rows. Spaced-apart hinge eyes extending from each end of the modules include aligned rod apertures. The hinge eyes along the leading end of a row of modules are interleaved with the hinge eyes along the trailing end of an adjacent row. Hinge rods, residing in the aligned rod apertures of interleaved hinge eyes, connect adjacent rows together end to end to form a conveyor belt of selected length and width capable of articulating about a drive sprocket or drum at the hinges formed between adjacent belt rows.

But belt motion and belt tension, especially in an environment subjected to wide temperature excursions, can cause the hinge rods to migrate along the hinge or to lengthen relative to the width of the belt. If a rod migrates away from one side of the belt, the modules at that side can disengage, which can cause damage to the belt. If a rod is allowed to extend out of the hinge beyond the side of the belt, the rod can catch on conveyor structure or other objects and cause damage. Consequently, it is important that hinge rods be contained within the belt.

Some conventional modular plastic conveyor belts use a stop in the form of a thin strip molded integrally as part of an edge module of a modular belt to retain a hinge rod in the belt. The integrally-molded stop and edge module are both made of the same material. But some applications require that the module exhibit properties, such as flexibility or stiffness, that are inconsistent with forming a firm, but resilient stop that can elastically bend from a blocking position preventing a hinge rod from migrating past the side edge of the belt to a non-blocking position during insertion of a hinge rod into a rod aperture in the belt.

Consequently, there is a need for a rod retention system for a modular plastic conveyor belt whose effectiveness does not depend on the material out of which the belt is molded.

SUMMARY

According to one aspect of the invention, an edge module for a modular plastic conveyor belt comprises a module body and a blocking element for retaining a hinge rod. The module body extends laterally in width from an outside first edge to a second edge. An aperture for receiving a hinge rod extends laterally inward from the first edge toward the second edge. A recess bounded by nonlinear first and second side walls extends from a first end to a second end. The aperture extends through the first side wall at the second end of the recess. The second side wall is disposed inward of the first side wall and is not intersected by the aperture. The blocking element, in the form of a resilient strip retained in the recess at the first end, is bendable at the second end between a first position and a second position. In the first position, the blocking element is biased against the first side wall and occludes the aperture to prevent a hinge rod received in the aperture from exiting the aperture. In the second position, the blocking element is pushed closer to the second side wall and generally clear of the aperture by the force exerted by a hinge rod being inserted into the aperture from the first edge.

According to another aspect of the invention, an edge module for a modular plastic conveyor belt comprises a module body that extends longitudinally from a first module end to a second module end and laterally from an outside first edge inward to a second edge. An aperture in the module body at the second module end extends laterally from the first edge toward the second edge for axially receiving a hinge rod. A recess is formed between an outer wall and an inner wall and intersects the aperture. The aperture outward of the outer wall forms an acute angle with the outer wall toward the first module end. A resilient blocking element retained in the recess has an outwardly convex face biased against the outer wall to occlude the aperture in a first position. The blocking element is bendable away from the outer wall toward the inner wall to a second position by the force of a hinge rod being inserted into the aperture from the outside first edge of the module body against the outwardly convex face of the blocking element.

According to yet another aspect of the invention, an edge module for a modular plastic conveyor belt comprises a module body and a resilient blocking element for retaining a hinge rod. The module body extends longitudinally from a first module end to a second module end and laterally from an outside first edge inward to a second edge. The module body includes an aperture that extends laterally from the first edge toward the second edge for axially receiving a hinge rod. A recess is defined on an outer side by a curving wall sweeping inward to a second end laterally inward of and longitudinally offset from an opposite first end. The aperture extends through the curved wall at the second module end. A resilient blocking element is retained in the recess and is biased against the curving wall in a first position occluding the aperture. The blocking element is elastically deformable to a non-occluding second position away from the curving wall by the inwardly directed insertion force of a hinge rod against the blocking element.

Another version of an edge module for a modular plastic conveyor belt comprises an edge portion that extends laterally inward from an outside first edge of the edge module. An aperture formed in the edge portion extends laterally inward from the outside first edge to axially accept a hinge rod. First and second interior walls in the edge portion bound a recess that extends from a first end to a second end. The aperture opens into the recess obliquely through the first interior wall at the second end of the recess. A resilient blocking element, retained in the recess at the first end, is biased against the first interior wall in a first position occluding the aperture. The blocking element is elastically deformable to a non-occluding second position between the first interior wall and the second interior wall by the inwardly directed insertion force of a hinge rod against the blocking element.

BRIEF DESCRIPTION OF THE DRAWINGS

These features and aspects of the invention, as well as its advantages, are better understood by reference to the following description, appended claims, and accompanying drawings in which:

DETAILED DESCRIPTION

Figure 1:
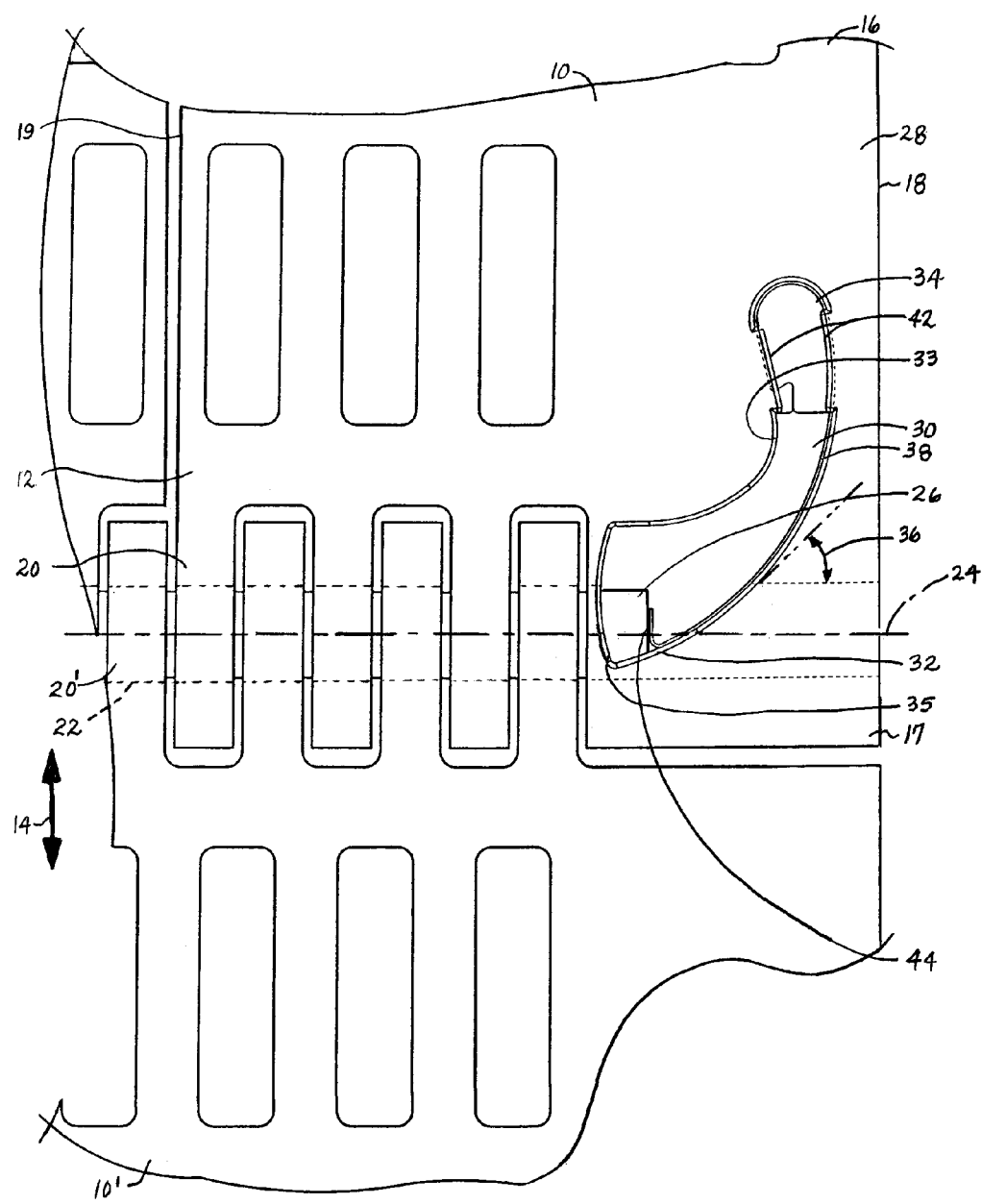
FIG. 1 is a top plan view of a portion of a modular conveyor belt showing edge modules embodying features of the invention.

An outer portion of an edge module embodying features of the invention is shown in FIG. 1 at the outside edge of a conveyor belt. The edge module 10 is connected to an adjacent edge module 10'. The edge module has a module body 12 that extends longitudinally in a direction of belt travel 14 from a first end 16 to a second end 17. The module body extends laterally from an outside edge 18 to an inner edge 19. Hinge eyes 20, 20' along the first and second ends of adjacent modules have lateral apertures 22 formed in them. When the modular belt is assembled, the hinge eyes along the first end of one row of side-by-side belt modules are interleaved with the hinge eyes along the second end of an adjacent row. The apertures in the interleaved hinge eyes are laterally aligned along an axis 24 to form a passageway extending the width of the belt. A hinge rod 26 axially received in the passageway connects adjacent belt rows together at a hinge joint. The belt can articulate at the hinge joint as the belt goes around drive and idle sprockets or rides over shoes, rollers, or drums.

The outside edge of the edge module includes an edge portion 28, preferably thicker than the hinge eyes to strengthen the side of the belt. The hinge rod aperture 22 extends through the edge portion and opens onto the outside edge 18 of the module. The aperture is intersected by an interior recess 30 formed in the edge portion. The recess is bounded by a first outer side wall 32 and a second inner side wall 33. The recess extends from a first end 34 to an opposite second end 35. The aperture 22 extends through the outer wall 32, as better shown in FIG. 2. The outer wall is shown as a nonlinear, arcuate surface that sweeps inward from the first end of the recess toward the second end so that the first end is laterally offset from the second end and closer to the outside edge. The second side wall is also curved and diverges from the first side wall toward the second end of the recess. The inner second side wall has an average curvature greater than that of the outer side wall. Unlike the outer side wall, the inner side wall does not intersect the hinge rod aperture. The outer side wall 32 forms an acute angle 36 with the outermost segment of the aperture.

A blocking element in the form of a bent metal strip 38 is retained in the recess. The strip is resilient and is made of a metal such as spring steel. The metal strip has a hook 40 at the first end of the recess. Retention structure in the form of raised bosses or protrusions 42 formed along the side walls of the recess engage the compressed hooked end to retain the strip in place.

Figure 3:
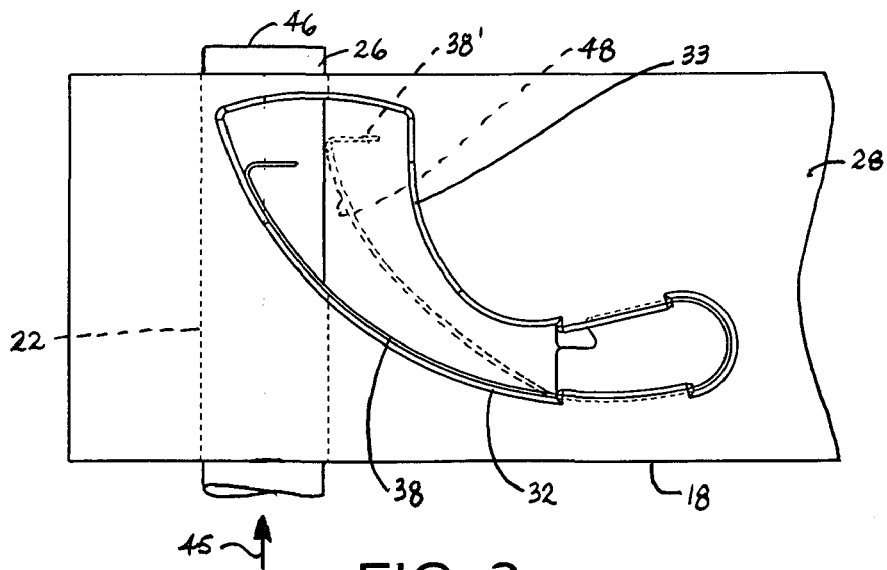
FIG. 3 is a top plan view of an edge portion of an edge module as in FIG. 2 showing the blocking element in a blocking position and, in phantom, in a non-blocking position.

As shown in FIG. 3, the blocking element normally assumes a blocking position 38 biased against the outer side wall 32 of the recess. In the blocking position, the blocking element completely or partly occludes the aperture 22. A hinge rod retained in the belt's rod passageway is prevented from exiting the side of the belt by the blocking element, as shown in FIG. 1. The end of the blocking element preferably includes a flat face 44, formed by a bend in the metal strip, to bear the load of a hinge rod trying to work its way out of the belt. The rod pushes against the flat face, but, because the blocking element is against the outer side wall and can move no farther, the rod cannot push the blocking element out of its occluding position.

Although the blocking member prevents a rod from migrating out of the belt, it allows insertion of a rod with little effort. As shown in FIG. 3, when a hinge rod 26 is inserted into the aperture 22 from the side edge 18 of the edge module, its head end 46 exerts a force against the curved outer face 48 of the blocking element. The force elastically deforms the blocking element, pushing it into a non-occluding position 38' closer to the inner side wall 33. In the non-occluding position, the metal strip allows the hinge rod to be inserted easily into the belt. Once the tail end of the rod clears the blocking element, it snaps back under its inherent spring action into its occluding position biased against the outer wall.

Figure 4:
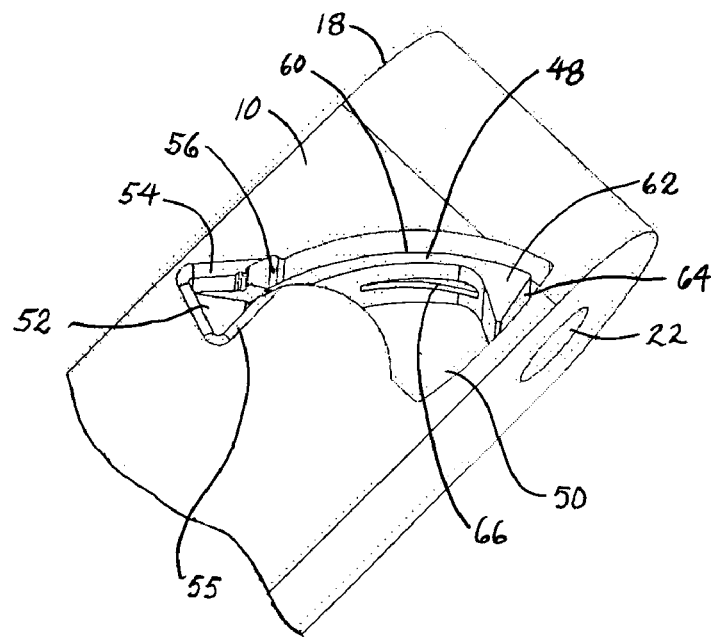
FIG. 4 is an isometric view of an edge portion of an edge module as in FIG. 2 showing a different version of a blocking element.
Figure 5:
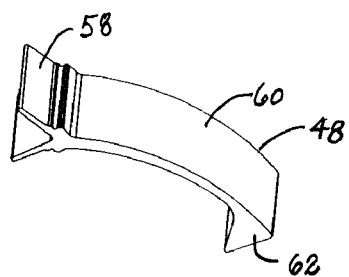
FIG. 5 is a pictorial view of the blocking element of FIG. 4.

Another version of the blocking element is shown in FIGS. 4 and 5. In this example, the blocking element 48 is in the form of a resilient strip molded out of a thermoplastic polymer, such as acetal. Like the metal strip, the plastic strip is made of a resilient material to provide the spring action necessary for effective rod insertion and rod retention. This allows edge modules 10 to be molded separately out of conventional materials, such as polypropylene, polyethylene, and composite polymers, which may not provide high enough elasticity for the blocking element.

Figure 2:
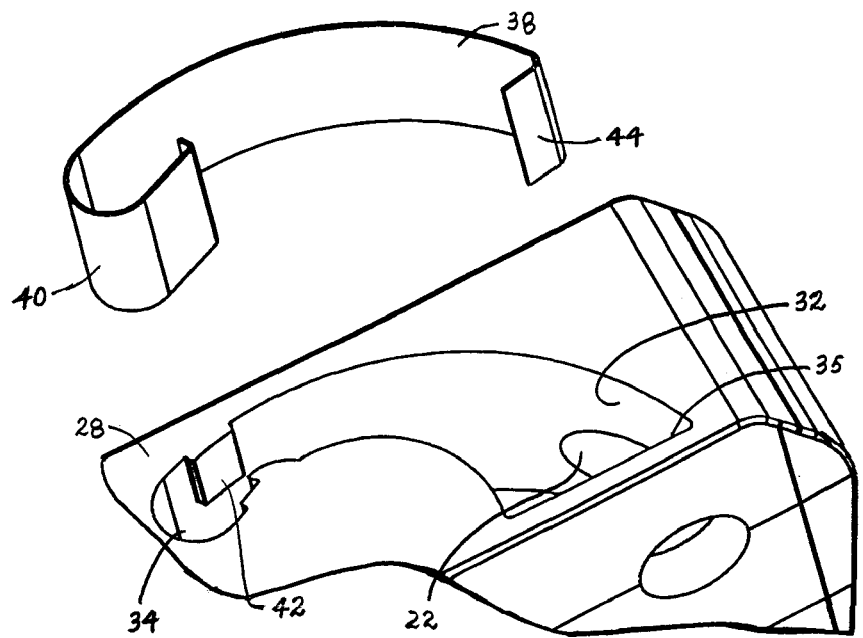
FIG. 2 is an exploded view of an outer edge portion of an edge module as in FIG. 1 with a rod-blocking element.

The recess 50 for the strip 48 has the same general shape as the recess in FIGS. 1-3. A first end 52 of the recess is bounded by two tapering side wall portions 54, 55 that merge to a mouth 56 opening into the major portion of the recess. The converging side wall portions serve as retention structure for the forked end 58 of the plastic strip. Like the metal strip, the plastic strip presents an outwardly convex face 60 to hinge rods being inserted into the aperture 22 from the outside edge 18 of the edge module. The strip terminates in an enlarged head 62 at the second end of the recess. The enlarged head includes a flat face 64 that blocks the aperture to prevent migration of a hinge rod from the belt. A reinforcing strut 66 runs from the head toward the other end of the strip to increase its strength and extend its life. In operation, the plastic strip behaves like the metal strip in blocking hinge rods from exiting, while allowing their easy insertion.

Although the invention has been described in detail with respect to a few preferred versions, other versions are possible. For example, the side walls forming the recess could comprise a series of straight segments rather than a smooth curve. As another example, the retention structure at the first end of the recess in the edge module and the retained structure of the blocking element at its tail end could be realized in many ways. And the blocking element could be inserted into the mold and the edge module formed around its tail end for permanent retention. Furthermore, a plastic blocking element made of a different plastic material from the rest of the edge module could be co-molded with the edge module. So, as these few examples suggest, the scope of the claims is not meant to be limited to the specifics of the preferred versions described in detail.

What is claimed is:

1. An edge module for a modular plastic conveyor belt, the edge module comprising:
    a module body extending laterally in width from an outside first edge to a second edge and including:
        an aperture extending laterally inward from the first edge toward the second edge for receiving a hinge rod, and a recess bounded by nonlinear first and second side walls extending from a first end to a second end, wherein the aperture extends through the first side wall at the second end and wherein the second side wall is disposed inward of the first side wall and not intersected by the aperture; and a blocking element in the form of a resilient strip retained in the recess at the first end and bendable at the second end between a normal first position self-biased against the first side wall and occluding the aperture to prevent a hinge rod received in the aperture from exiting the aperture and a second position closer to the second side wall and generally clear of the aperture by the force that a hinge rod being inserted into the aperture from the first edge exerts against the blocking element.

2. An edge module as in claim 1 wherein the blocking element is made of metal.

3. An edge module as in claim 1 wherein the edge module is made of a first plastic material and the blocking element is made of a second plastic material having more elasticity than the first plastic material.

4. An edge module as in claim 1 wherein the blocking element is hooked at least one end.

5. An edge module as in claim 1 wherein the blocking element is forked at the first end of the recess.

6. An edge module as in claim 1 wherein the blocking element includes a blocking face at the second end of the recess and occluding the aperture to block the exit of a received hinge rod when the blocking element is in the first position.

7. An edge module as in claim 1 wherein the module body further includes retention structure at the first end of the recess for retaining the blocking element in the recess.

8. An edge module as in claim 1 wherein the retention structure includes protrusions from the first and second side walls at the first end of the recess retaining the strip in the recess.

9. An edge module as in claim 1 wherein the retention structure is formed by a convergence of the first and second side walls at the first end of the recess.

10. An edge module as in claim 1 wherein the first and second side walls include arcuate portions toward the second end of the recess.

11. An edge module as in claim 10 wherein the arcuate portion of the first side wall has a curvature less than the curvature of the second side wall.

12. An edge module as in claim 1 wherein the first and second side walls diverge toward the second end of the recess.

13. An edge module for a modular plastic conveyor belt, the edge module comprising:
a module body extending longitudinally from a first module end to a second module end and laterally from an outside first edge inward to a second edge and including:
an aperture at the second module end extending laterally from the first edge toward the second edge for axially receiving a hinge rod, and
a recess formed between an outer wall and an inner wall and intersecting the aperture, wherein the aperture outward of the outer wall forms an acute angle with the outer wall toward the first module end; and
a resilient blocking element retained in the recess and having an outwardly convex face self-biased against the outer wall and occluding the aperture in a normal first position and bendable away from the outer wall toward the inner wall to a second position by the force of a hinge rod being inserted into the aperture from the outside first edge of the module body against the outwardly convex face of the blocking element.

14. An edge module for a modular plastic conveyor belt, the edge module comprising:
a module body extending longitudinally from a first module end to a second module end and laterally from an outside first edge inward to a second edge and including:
an aperture extending laterally from the first edge toward the second edge for axially receiving a hinge rod, and
a recess defined on an outer side by a curving wall sweeping inward to a second end laterally inward of and longitudinally offset from an opposite first end, wherein the aperture extends through the curved wall at the second module end; and
a resilient blocking element retained in the recess and self-biased against the curving wall in a normal first position occluding the aperture, wherein the blocking element is elastically deformable to a second non-occluding position away from the curving wall by the inwardly directed insertion force of a hinge rod against the blocking element.

15. An edge module for a modular plastic conveyor belt, the edge module comprising:
an edge portion extending laterally inward from an outside first edge of the edge module and including:
an aperture extending laterally inward from the outside first edge for axially accepting a hinge rod; and
first and second interior walls bounding a recess extending from a first end to a second end, wherein the aperture opens into the recess obliquely through the first interior wall at the second end of the recess; and
a resilient blocking element retained in the recess at the first end and self-biased against the first interior wall in a normal first position occluding the aperture, wherein the blocking element is elastically deformable to a second non-occluding position between the first interior wall and the second interior wall by the inwardly directed insertion force of a hinge rod against the blocking element.

16. An edge module as in claim 15 wherein the edge portion further includes retention structure at the first end of the recess for retaining the blocking element in the recess.

17. An edge module as in claim 16 wherein the retention structure is formed by a convergence of the first and second interior walls at the first end of the recess.

18. An edge module as in claim 15 wherein the first and second interior walls diverge toward the second end of the recess.

19. An edge module as in claim 14 wherein the module body further includes retention structure including a restriction in the recess at an end of the recess opposite the aperture for retaining the blocking element in the recess.

20. An edge module as in claim 14 wherein the blocking element includes a blocking face at an end of the recess opposite the aperture and occluding the aperture to block the exit of a received hinge rod when the blocking element is in the first position.

* * * * *